United States Patent
Belotserkovsky et al.

(10) Patent No.: US 8,401,119 B2
(45) Date of Patent: Mar. 19, 2013

(54) EQUALIZER BASED SYMBOL TIMING RECOVERY WITH SYMBOL ENABLED CONTROL

(75) Inventors: Maxim Belotserkovsky, Carmel, IN (US); Aaron Reel Bouillet, Noblesville, IN (US)

(73) Assignee: Thomson Licensing, Boulogne-Billancourt (FR)

( * ) Notice: Subject to any disclaimer, the term of this patent is extended or adjusted under 35 U.S.C. 154(b) by 195 days.

(21) Appl. No.: 12/735,366

(22) PCT Filed: Jan. 10, 2008

(86) PCT No.: PCT/US2008/000368
§ 371 (c)(1),
(2), (4) Date: Jul. 9, 2010

(87) PCT Pub. No.: WO2009/088388
PCT Pub. Date: Jul. 16, 2009

(65) Prior Publication Data
US 2010/0289965 A1    Nov. 18, 2010

(51) Int. Cl.
*H03K 5/159* (2006.01)
*H04L 27/22* (2006.01)
*H03D 1/04* (2006.01)
(52) U.S. Cl. .......................... 375/329; 375/326; 375/346
(58) Field of Classification Search .......... 375/229–236, 375/329, 346
See application file for complete search history.

(56) References Cited

U.S. PATENT DOCUMENTS

| | | | |
|---|---|---|---|
| 4,334,313 A | 6/1982 | Gitlin et al. | |
| 4,411,000 A | 10/1983 | Kustka | |
| 4,815,103 A | 3/1989 | Cupo et al. | |
| 5,517,526 A * | 5/1996 | Caudron et al. | 375/232 |
| 6,414,990 B1 | 7/2002 | Jonsson et al. | |
| 2006/0171451 A1* | 8/2006 | Pietraski et al. | 375/232 |
| 2007/0091992 A1* | 4/2007 | Dowling | 375/229 |

OTHER PUBLICATIONS

"ATSC Digital Television Standard (A/53) Revision E, with Amendments No. 1 and 2", Advanced Television Systems Committee, Doc. A/53E, Dec. 27, 2005.
"Recommended Practice: Guide to the Use of the ATSC Digital Television Standard", Advanced Television Systems Committee, Doc. A/54A, Dec. 4, 2003.
Search Report Dated Dec. 12, 2008.

* cited by examiner

*Primary Examiner* — Ted Wang
*Assistant Examiner* — Janice Tieu
(74) *Attorney, Agent, or Firm* — Robert D. Shedd; Joseph J. Opalach (57) ABSTRACT

A receiver is an ATSC (Advanced Television Systems Committee)-receiver and comprises a controller and an equalizer, which comprises a feed-forward filter and a feed-back filter. The feed-forward filter comprising at least one tap associated with at least one tap coefficient value. The controller determines a location of at least one tap of the equalizer; and if that location is close to a tap boundary (or edge) of the equalizer, the at least one tap of the equalizer is shifted forward or backward by at least one sample position.

16 Claims, 11 Drawing Sheets

FIG. 1

*Prior Art*

EQUALIZER BASED SYMBOL TIMING RECOVERY WITH SYMBOL ENABLED CONTROL

This application claims the benefit, under 35 U.S.C. §365 of International Application PCT/US2008/000368, filed Jan. 10, 2008, which was published in accordance with PCT Article 21(2) on Jul. 16, 2009 in English.

BACKGROUND OF THE INVENTION

The present invention generally relates to communications systems and, more particularly, to a receiver.

Figure 1:
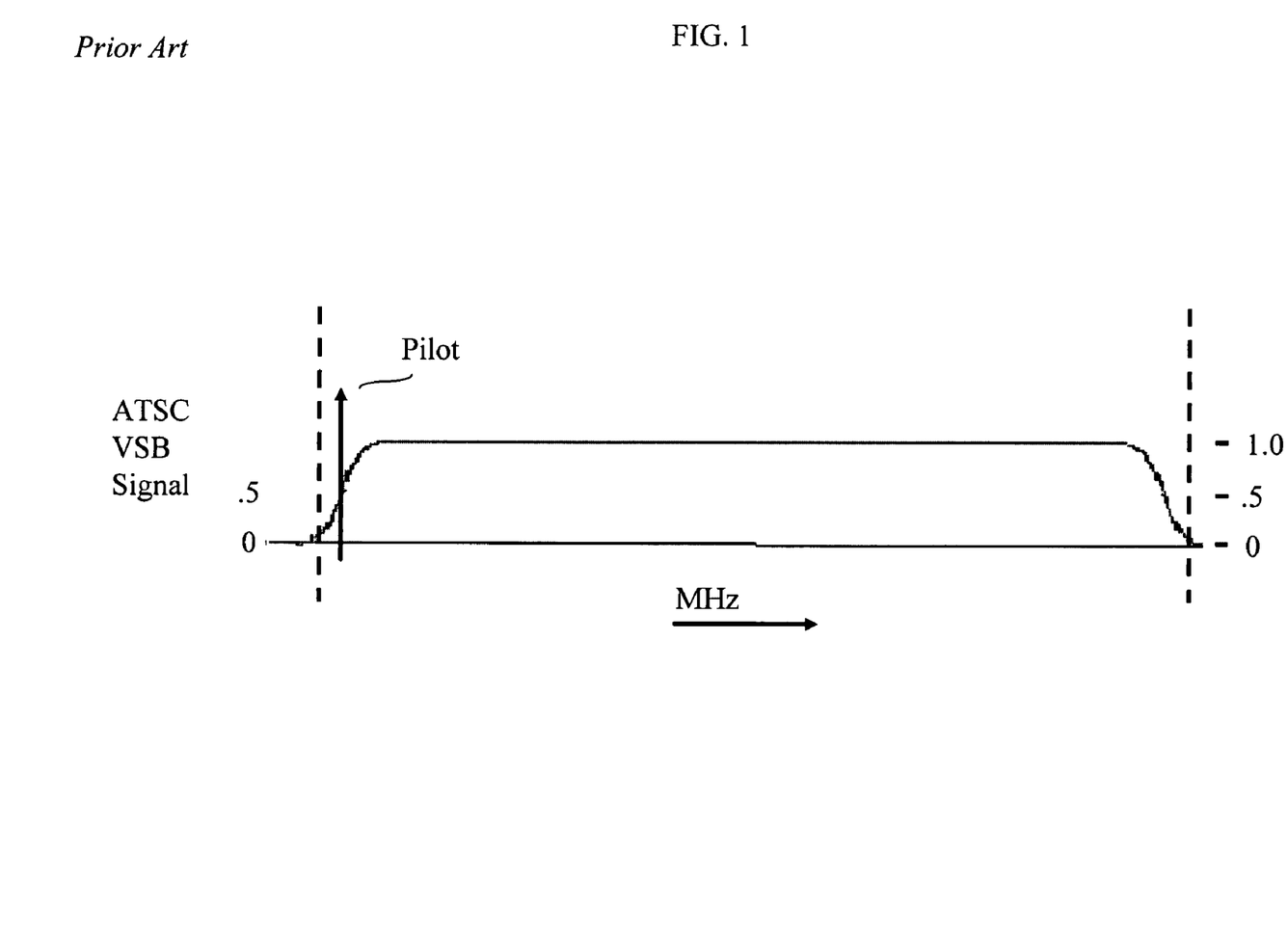
FIG. 1 shows an illustrative ATSC VSB signal spectrum.

In the ATSC (Advanced Television Systems Committee) standard for digital terrestrial television (DTV) in the United States (e.g., see, United States Advanced Television Systems Committee, "ATSC Digital Television Standard", Document A/53, Sep. 16, 1995), the modulation system consists of a suppressed carrier vestigial sideband (VSB) modulation with an added small in-phase pilot at the suppressed carrier frequency, 11.3 dB below the average signal power, at the lower VSB signal edge. An illustrative spectrum for an ATSC VSB signal is shown in FIG. 1.

In a communications receiver, such as an ATSC receiver, it may be difficult or impossible to perform continuous "blind" timing (sampling clock) recovery, i.e., recovery which is not making use of the knowledge of the bit stream being received. In such instances, data-aided recovery may be implemented to supplement the "blind" methods. Data-aided timing recovery uses a decoded (or training) bit stream in conjunction with the received modulated stream to generate sampling error information to drive a Symbol Timing Recovery (STR) Loop.

Figure 2:
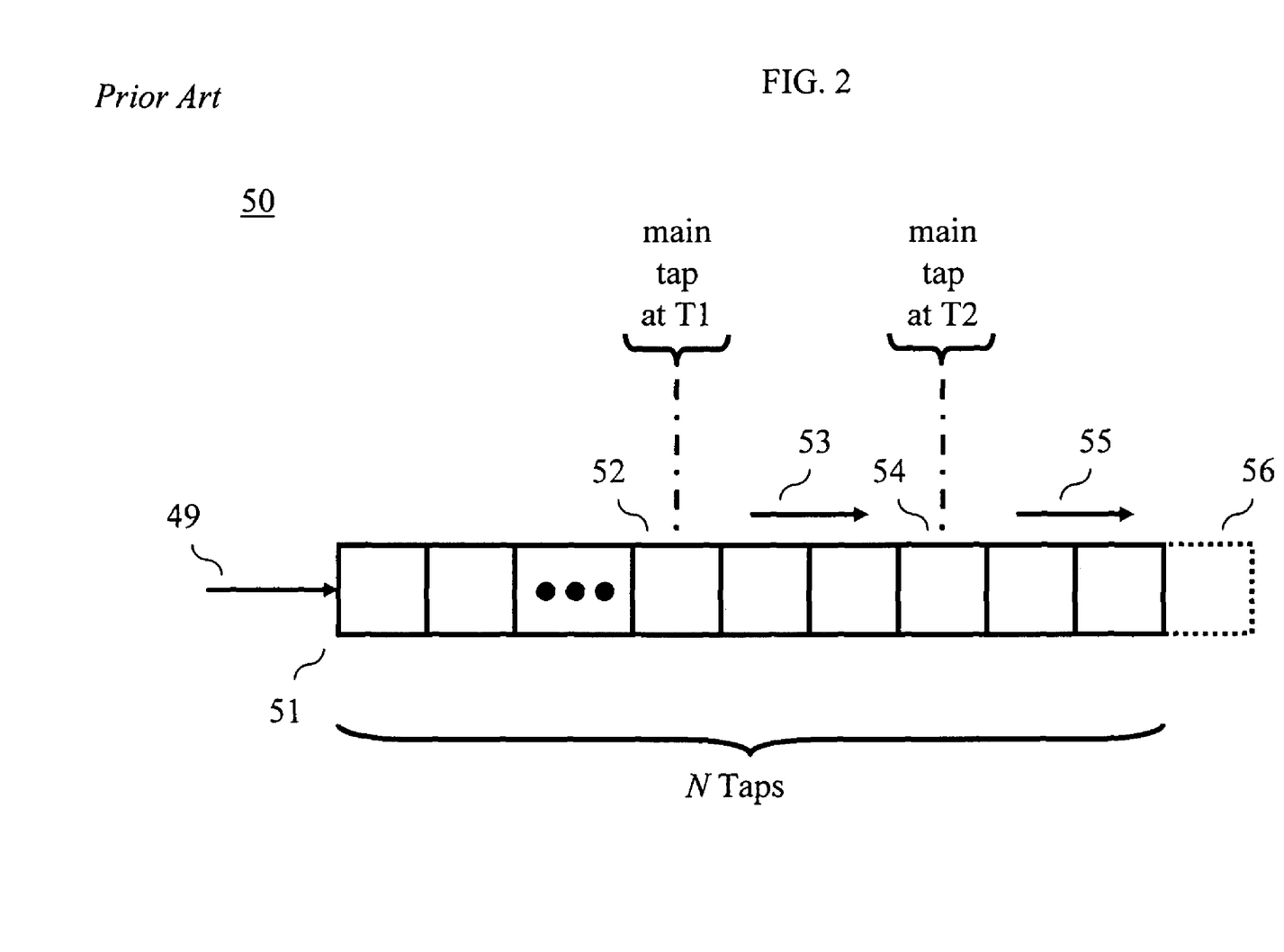
FIG. 2 illustrates a prior art problem with changing equalizer taps to correct for sampling drift.

For example, in an ATSC receiver an estimate of the transmitted bit stream is available at the equalizer output, while the system interpolator (used to adjust the timing phase) is usually located before the equalizer. However, this arrangement creates a problem when the equalizer is located inside the STR loop because it creates unwanted interaction between the two. As such, another way to perform data-aided recovery is for the equalizer to assume the function of tracking the residual timing frequency and/or phase offset (provided the offset is slow enough for the equalizer to track). Unfortunately, the problem with this method is that as the main equalizer tap changes to correct for the sampling drift, the sampling drift may exceed the equalizer range. This is conceptually illustrated in FIG. 2. For the purposes of describing the problem an equalizer 50 comprises a feed-forward filter having a shift register 51. Associated with each sample is a tap (not shown) of the feed-forward filter. The shift register 51 stores N samples of an input signal 49 at sample times provided by a sample clock (not shown). At a time T1, the main tap of equalizer 50 is associated with the sample at shifter register location 52. However, sampling drift occurs over time in the direction of arrow 53 such that at a subsequent time, T2, the main tap of equalizer 50 is adjusted to be associated with the sample at shift register location 54 to correct for this sample drift. Unfortunately, as the sampling drift continues over time, as represented by arrow 55, the main tap of equalizer 50 can no longer be adjusted to correct for the sampling drift, since the main tap would have to be associated with the sample located at shift register location 56—as represented in dotted line form, which exceeds the range of the equalizer since only N taps are available. A common way to solve this problem is to prevent the equalizer taps from consistently drifting in either direction by having the time-base locked by other means (blind or data-aided). However, even this solution does not prevent exceeding the range of the equalizer because of changes in the transmission channel response.

SUMMARY OF THE INVENTION

A receiver makes use of the ability of an equalizer to act as a tracking interpolator —resulting in an advantageous, low-complexity, receiver architecture that allows for simple and effective data-aided recovery to be performed by the equalizer while still allowing the equalizer to perform its main functions. In particular, and in accordance with the principles of the invention, a receiver determines a location of at least one tap of an equalizer; and if that location is close to a tap boundary (or edge) of the equalizer, the at least one tap of the equalizer is shifted forward or backward by at least one sample position.

In an illustrative embodiment of the invention, a receiver is an ATSC (Advanced Television Systems Committee)-receiver and comprises a controller and an equalizer, which comprises a feed-forward filter and a feed-back filter. The feed-forward filter comprising at least one tap associated with at least one tap coefficient value. The controller determines a location of at least one tap of the equalizer; and if that location is close to a tap boundary (or edge) of the equalizer, the at least one tap of the equalizer is shifted forward or backward by at least one sample position.

In another illustrative embodiment of the invention, the receiver is an ATSC-receiver that performs symbol timing recovery using a equalizer; determines if the taps of the equalizer may be drifting out of range in a direction; and, if so, adjusts the tap of the equalizer by one, or more, sample positions in the opposite direction.

In view of the above, and as will be apparent from reading the detailed description, other embodiments and features are also possible and fall within the principles of the invention.

DETAILED DESCRIPTION

Other than the inventive concept, the elements shown in the figures are well known and will not be described in detail. Also, familiarity with television broadcasting, receivers and video encoding is assumed and is not described in detail herein. For example, other than the inventive concept, familiarity with current and proposed recommendations for TV standards such as NTSC (National Television Systems Committee), PAL (Phase Alternation Lines), SECAM (SEquential Couleur Avec Memoire) and ATSC (Advanced Television Systems Committee) (ATSC) is assumed. Further information on ATSC broadcast signals can be found in the following ATSC standards: Digital Television Standard (A/53), Revision C, including Amendment No. 1 and Corrigendum No. 1, Doc. A/53C; and *Recommended Practice: Guide to the Use of the ATSC Digital Television Standard* (A/54). Likewise, other than the inventive concept, transmission concepts such as eight-level vestigial sideband (8-VSB), Quadrature Amplitude Modulation (QAM), orthogonal frequency division multiplexing (OFDM) or coded OFDM (COFDM)), and receiver components such as a radio-frequency (RF) front-end, receiver section, low noise block, tuners, demodulators, Hilbert filters, carrier tracking loop, correlators, leak integrators and squarers is assumed. Similarly, other than the inventive concept, formatting and encoding methods (such as Moving Picture Expert Group (MPEG)-2 Systems Standard (ISO/IEC 13818-1)) for generating transport bit streams are well-known and not described herein. Also, those skilled in the art appreciate that carrier recovery involves processing in the real and the complex domains. It should also be noted that the inventive concept may be implemented using conventional programming techniques, which, as such, will not be described herein. Finally, like-numbers on the figures represent similar elements.

Figure 3:
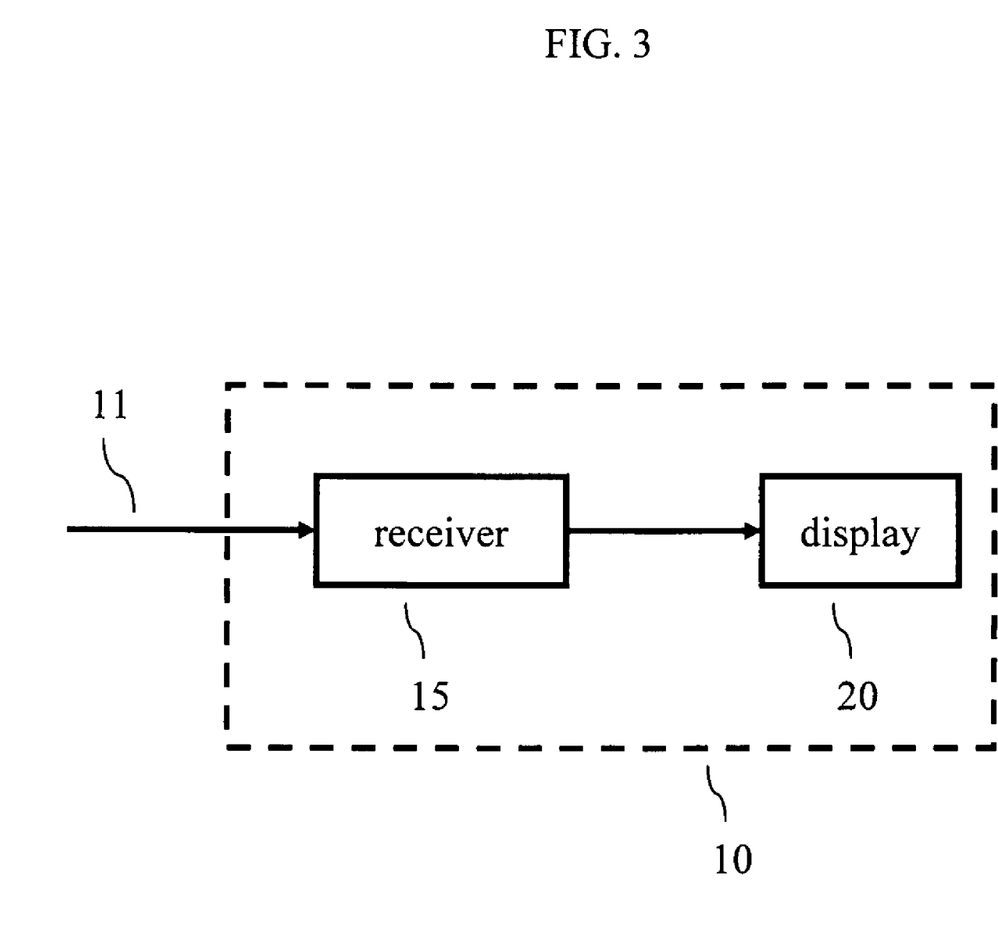
FIG. 3 shows an illustrative high-level block diagram of an apparatus embodying the principles of the invention.

A high-level block diagram of an illustrative apparatus 10 in accordance with the principles of the invention is shown in FIG. 3. Apparatus 10 includes a receiver 15 and a display 20. Illustratively, receiver 15 is an ATSC-compatible receiver. It should be noted that receiver 15 may also be NTSC (National Television Systems Committee)-compatible, i.e., have an NTSC mode of operation and an ATSC mode of operation such that apparatus 10 is capable of displaying video content from an NTSC broadcast or an ATSC broadcast. For simplicity in describing the inventive concept, only the ATSC mode of operation is described herein. Receiver 15 receives a broadcast signal 11 (e.g., via an antenna (not shown)) for processing to recover therefrom, e.g., an HDTV (high definition TV) video signal for application to display 20 for viewing video content thereon. As noted earlier, an illustrative spectrum for an ATSC VSB signal is shown in FIG. 1.

Figure 4:
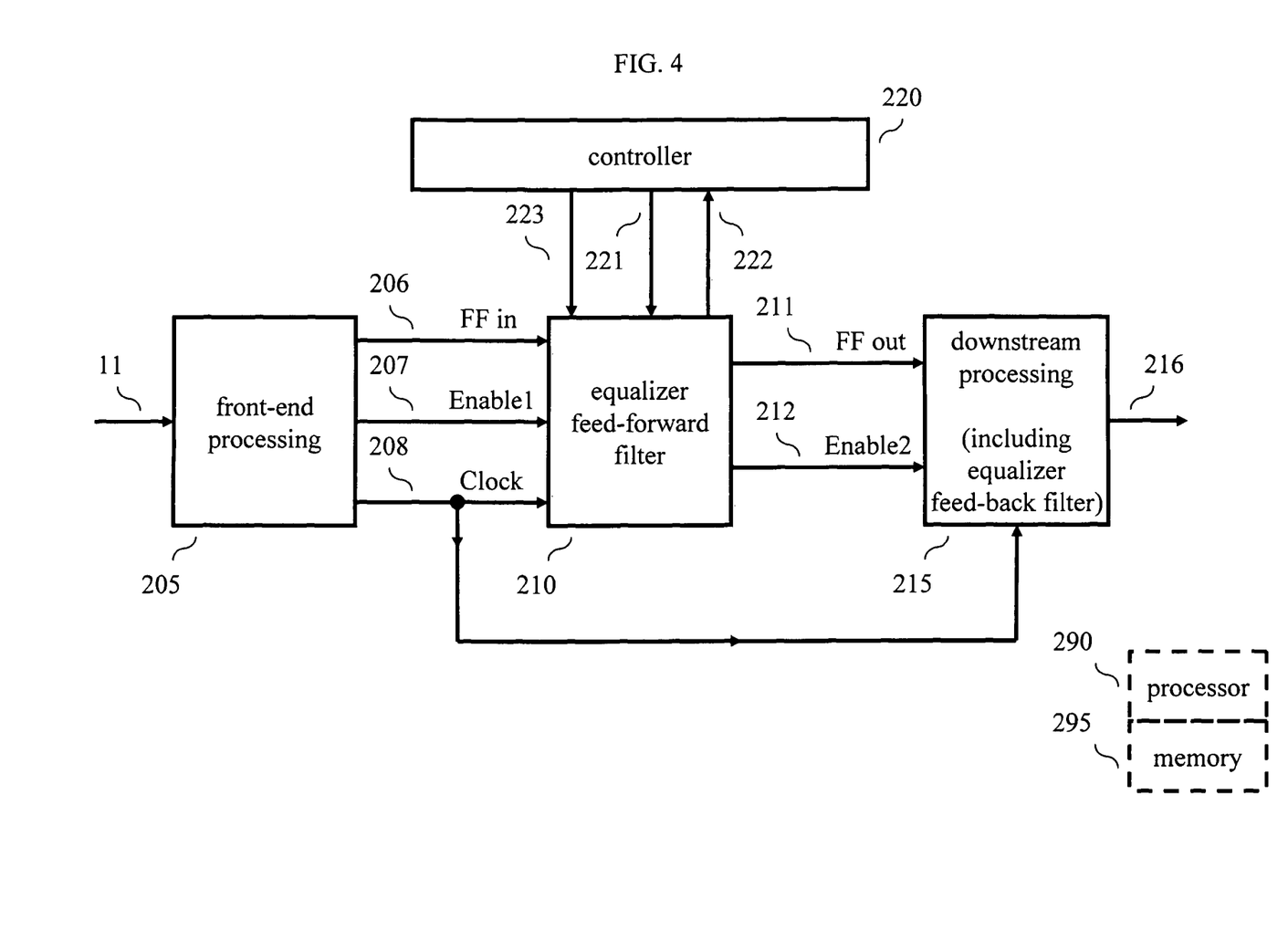
FIG. 4 shows a portion of a receiver embodying the principles of the invention.

Turning now to FIG. 4, that relevant portion of receiver 15 in accordance with the principles of the invention is shown. In particular, receiver 15 includes front-end processing element 205, feed-forward (FF) filter 210 of an equalizer, downstream processing element 215 and controller 220. Receiver 15 is a processor-based system and includes one, or more, processors and associated memory as represented by processor 290 and memory 295 shown in the form of dashed boxes in FIG. 4. In this context, computer programs, or software, are stored in memory 295 for execution by processor 290. The latter is representative of one, or more, stored-program control processors and these do not have to be dedicated to the receiver function, e.g., processor 290 may also control other functions of receiver 15 (or apparatus 10). Memory 295 is representative of any storage device, e.g., random-access memory (RAM), read-only memory (ROM), etc.; may be internal and/or external to receiver 15; and is volatile and/or nonvolatile as necessary. Front-end processing element represents those components for processing the received signal 11, e.g., a tuner section for providing an intermediate frequency (IF) signal, analog-to-digital (A/D) converter, etc. The equalizer of receiver 15 is illustratively a decision feedback equalizer (DFE) comprising a feed-forward (FF) filter 210 and a feed-back filter (not specifically shown in FIG. 4), which is a part of downstream processing element 215. Downstream processing element 215 not only includes the feed-back filter of the equalizer but also represents those components for further processing of the recovered signal, e.g., a convolutional decoder, transport processor, video decoder, audio decoder, etc., for providing, e.g., signal 216 representing selected content (e.g., video/audio) for a selected television (TV) program. Controller 220 receives information (described below) from feed-forward filter 210, via signal 222, and controls feed-forward filter 210 (and therefore controls the equalizer), via signal 221; and also provides a control signal 223 for use by front-end processing element 205.

Figure 5:
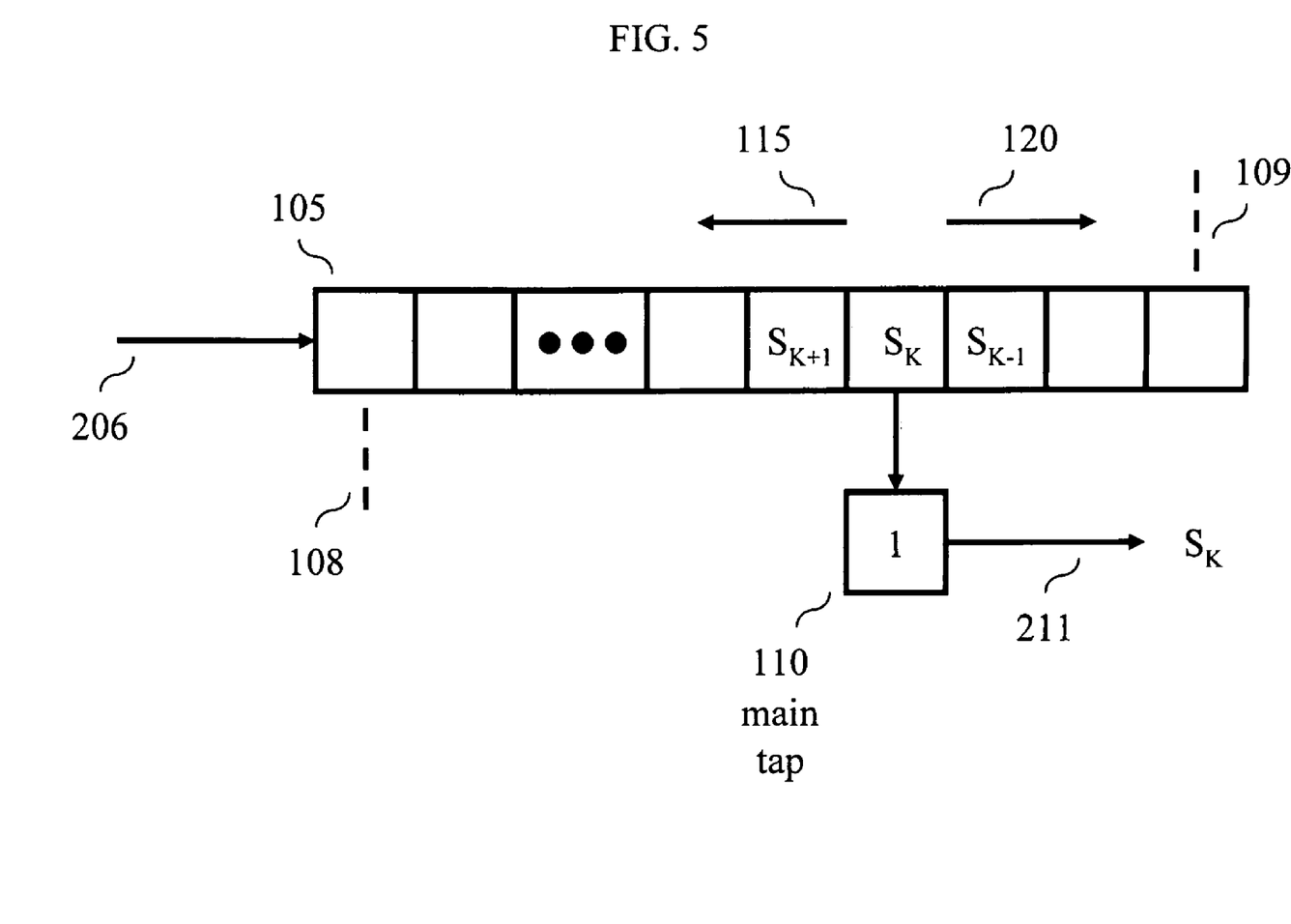
FIG. 5 shows an illustrative model of an equalizer in the context of the principles of the invention.

Attention should now be directed to FIG. 5, which is used to further illustrate the inventive concept. FIG. 5 represents an illustrative model of the feed-forward filter 210 of FIG. 4. It should be noted that it is assumed that the equalizer is being use to compensate for sampling drift, i.e., symbol timing recover (STR). The feed-forward filter 210 comprises a shift register 105 into which samples of the received signal (via signal 206) are clocked (signal 208 of FIG. 4, the clock is not shown in FIG. 5) and a single tap 110 (also referred to as the main tap) having an illustrative coefficient value of "1" for the purposes of explaining the inventive concept. The single tap 110 represents the equalizer response of feed-forward filter 210. At a sample time $T_k$, or K, the corresponding sample value in shift register 105 has an illustrative value of $S_K$. This sample value of the shift register is applied to main tap 110 for providing an output signal 211 of the feed-forward filter, which in this example is simply the value of $S_K$ (since the tap coefficient value is "1"). Now, suppose that the local sample rate at the equalizer input is higher than the transmitter symbol rate. As a result, over time, the equalizer response (represented by its single main tap in FIG. 5) will drift left (towards the "future" samples) as represented by arrow 115. However, as noted earlier, eventually the equalizer will no longer be able to correct for sampling drift and stop at the future sample represented by dashed line 108, which represents an edge or boundary of the equalizer. A similar problem exists in the other direction, i.e., if the local sample rate at the equalizer input is lower than the transmitter symbol rate. In this case, over time, the equalizer response (represented by its single main tap in FIG. 5) will drift right (towards the "past" samples) as represented by arrow 120. However, as noted above, eventually the equalizer will no longer be able to correct for sampling drift and stop at the past sample represented by dashed line 109, which represents the other edge or boundary of the equalizer. Therefore, and in accordance with the principles of the invention, a receiver determines a location of at least one tap of an equalizer; and if that location is close to a tap boundary (or edge) of the equalizer, the at least one tap of the equalizer is shifted forward or backward by at least one sample position.

Figure 6:
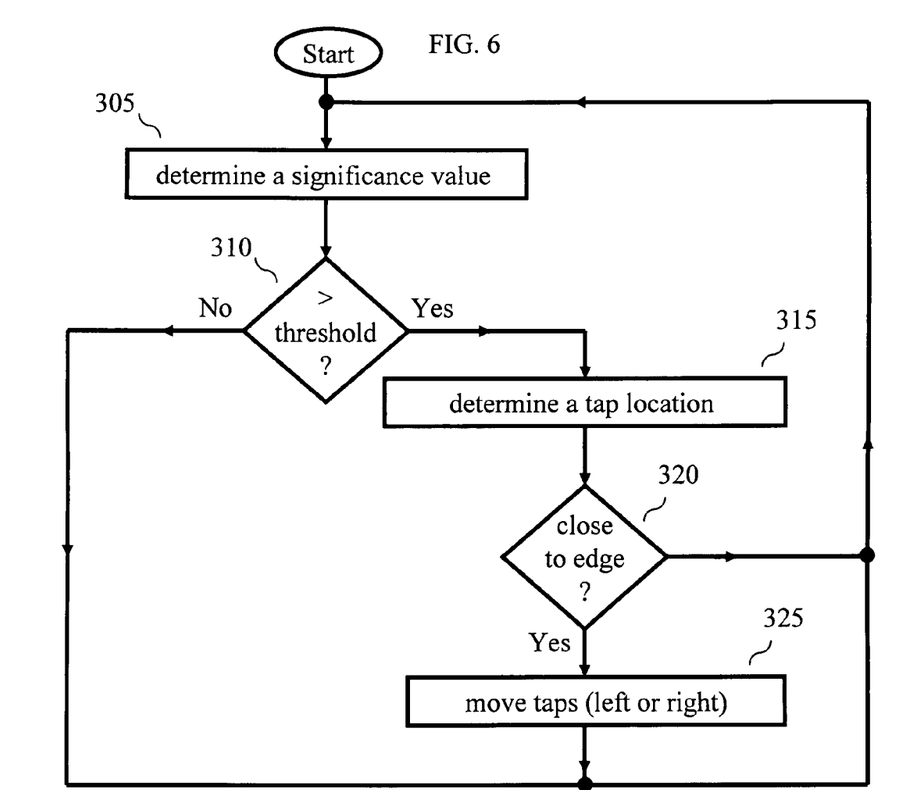
FIG. 6 shows an illustrative method in accordance with the principles of the invention.

Attention should now be directed to FIG. 6, which shows a flow chart for use in receiver 15 in accordance with the principles of the invention. Before describing the flow chart, it should be remembered that, other than the inventive concept, the equalizer of the receiver is still performing symbol timing recover (STR) and, as such, compensating for sampling drift by adjusting the position of the main tap as, e.g., in the prior art. Turning now to FIG. 6, in step 305, controller 220 of FIG. 4 determines "significance values" from the values of the tap coefficients of feed-forward filter 210. For example, if feed-forward filter 210 comprises N taps, where N>0, then for at least n ($1 \leq n \leq N$) of the taps, controller 220 determines associated significance values. As used herein, a "significance value" is also referred to as a "degree of significance." A "degree of significance" could be, for example, the fraction of the total power of all taps that the given tap (which has a given position in feed-forward filter 210) represents, where the total power would be, for example, based only on taps that exceed a certain signal-to-noise ratio (SNR)-dependent threshold. It should also be noted that if there is no distinct "main tap", as often is the case with an ATSC channel, then one can, equivalently, talk about the drift of the "center of mass" of the response, which can be computed from the sum of powers of appropriately weighted equalizer taps. Once controller 220 determines significance values (or degrees of significance) in step 305, controller 220 compares the largest significance value to a threshold value in step 310. If the largest significance value is not greater than the threshold value, execution continues with step 305. On the other hand, if the largest significance value is greater than the threshold value, then controller 220 determines the associated location of the tap in step 315. In step 320, controller 220 determines if the associated tap is close to the respective edge, e.g., within a certain number of taps, L, (e.g., L=4 taps) of the closest edge and close to drifting out-of-range (e.g., "falling off" the left edge of the equalizer tap delay line if the taps are drifting left). If not, execution continues with step 305. However, if controller 220 determines that the associated tap is close to the respective edge (the left or right edge), then controller 220 moves the taps left or right, via control signals 223 and 221, described below, in step 325. Thus, if the main tap has moved too far to the left, the main tap is now moved one, or more, samples to the right in step 325. Similarly, if the main tap has moved too far to the right, the main tap is now moved one, or more, samples to the left in step 325. Controller 220 can move the taps by, e.g., shifting, or re-arranging the tap coefficient values from one tap to another.

In order to move the samples left or right, controller 220 provides control signals 221 and 223. Control signal 223 is used in conjunction with moving the taps to the left, while control signal 221 is used in conjunction with moving the taps to the right.

Figure 7:
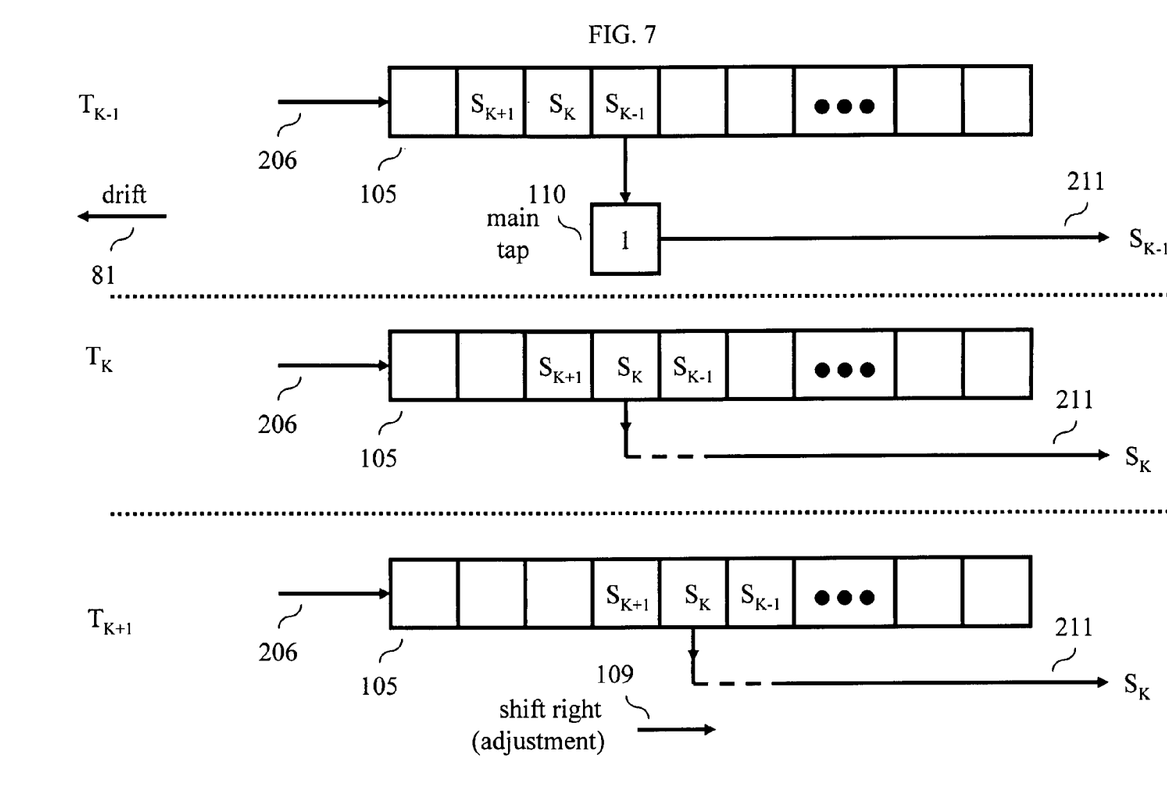
FIG. 7 conceptually illustrates the effect of shifting equalizer taps to the right in accordance with the principles of the invention.
Figure 8:
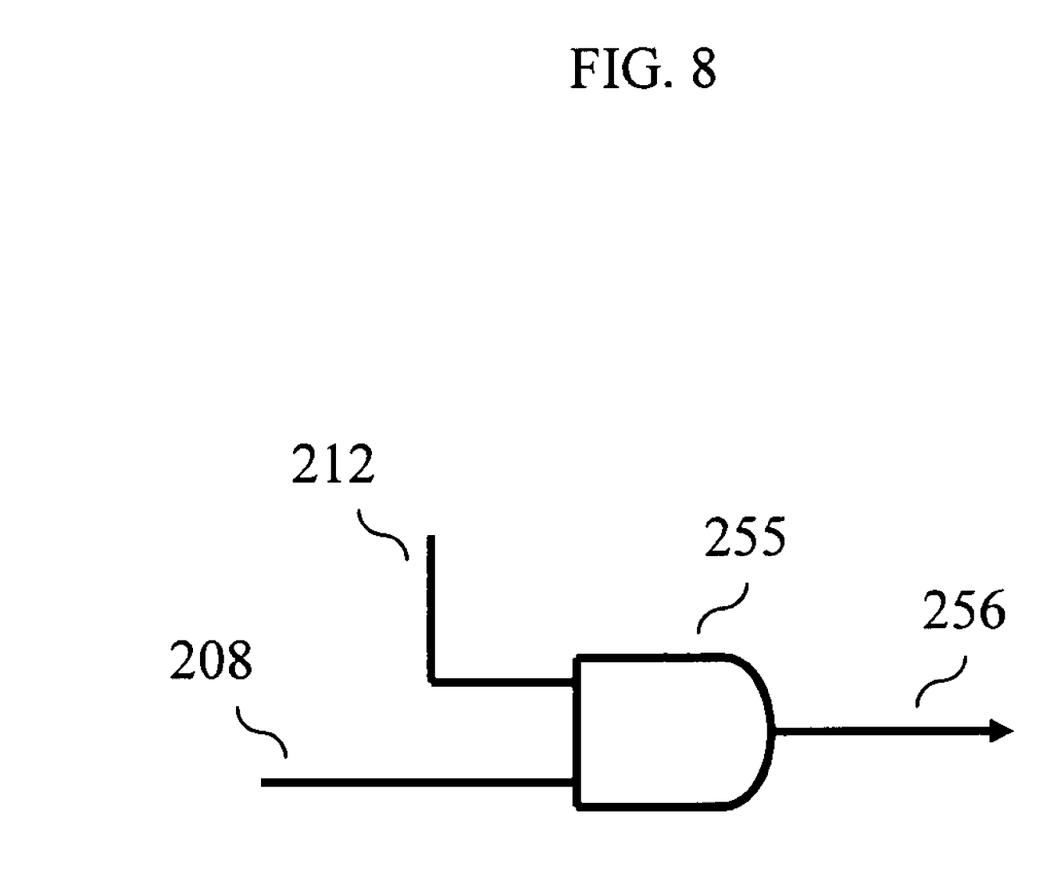
FIG. 8 illustrates control circuitry for use in adjusting taps to the right.

For moving, or adjusting, the taps to the right, consider the following. Without loss of generality, a flat channel is considered for simplicity (that has only a single main tap). This is illustrated in FIG. 7. FIG. 7 is similar to FIG. 4, the feed-forward filter 210 comprises a shift register 105 into which samples of the received signal (via signal 206) are clocked (signal 208 of FIG. 4, the clock is not shown in FIG. 7) and a single tap 110 (also referred to as the main tap) having an illustrative coefficient value of "1" for the purposes of explaining the inventive concept. The single tap 110 represents the equalizer response of feed-forward filter 210. At a sample time $T_{k-1}$, or K−1, the corresponding sample value in shift register 105 has an illustrative value of $S_{K-1}$. This sample value of the shift register is applied to main tap 110 for providing an output signal 211 of the feed-forward filter, which in this example is simply the value of $S_{K-1}$ (since the tap coefficient value is "1"). At the next sample time, $T_k$, the values in shift register 105 are shifted to the right and the corresponding sample value in shift register 105 associated with main tap 110 has an illustrative value of $S_K$—with the result that the output signal 211 has a value of $S_K$. It should be noticed that for simplicity, main tap 110 is now shown in FIG. 7 at sample time $T_k$ in dashed line form as a part of the arrow associated with output signal 211. However, now assume that controller 220 determines that the main tap is getting too close to the left edge (the taps are drifting in the direction of arrow 81 of FIG. 7) and that controller 220 now shifts right (adjusts) the main tap location, via control signal 221. Then, at the next sample time $T_{k+1}$, or K+1, and as can be observed from FIG. 7, this results in the value of $S_K$ again being output by feed-forward filter 210 since shift register 105 is still being clocked to shift the samples. Therefore, and in accordance with the principles of the invention, controller 220, via control signal 221, inhibits use of the extra sample "$S_K$". In particular, feed-forward filter 210 provides an enable signal 212 (shown as Enable 2) in FIG. 4 to downstream processing element 215. This enable signal is activated by controller 220, via control signal 221, when the tap is adjusted to the right. In particular, on the same clock edge as the movement of the main tap occurs, feed-forward filter 210 pulls signal 212 "LOW" (e.g., a logic level of "0") for inhibiting use of the extra sample "$S_K$" by downstream processing element 215. Downstream processing element includes, e.g., logic such as the "AND" gate 255 shown in FIG. 8. When signal 212 (Enable 2) is "LOW", logic gate 255 effectively disables clock 208 that is running downstream processing element 215 for one symbol time, such that the extra sample "$S_K$" present in output signal 211 is not used by downstream processing element 215.

Figure 9:
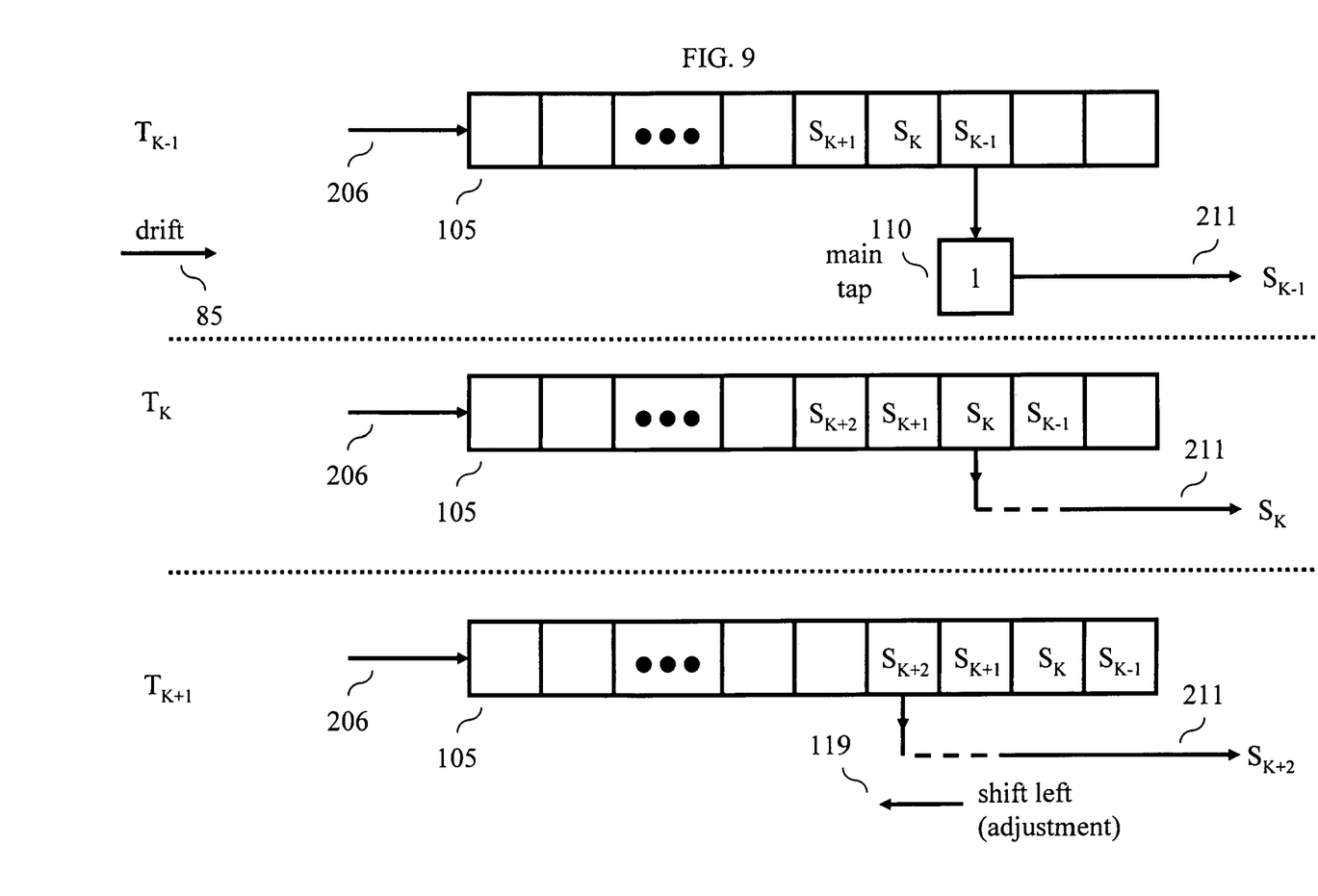
FIG. 9 conceptually illustrates the effect of shifting equalizer taps to the left in accordance with the principles of the invention.
Figure 10:
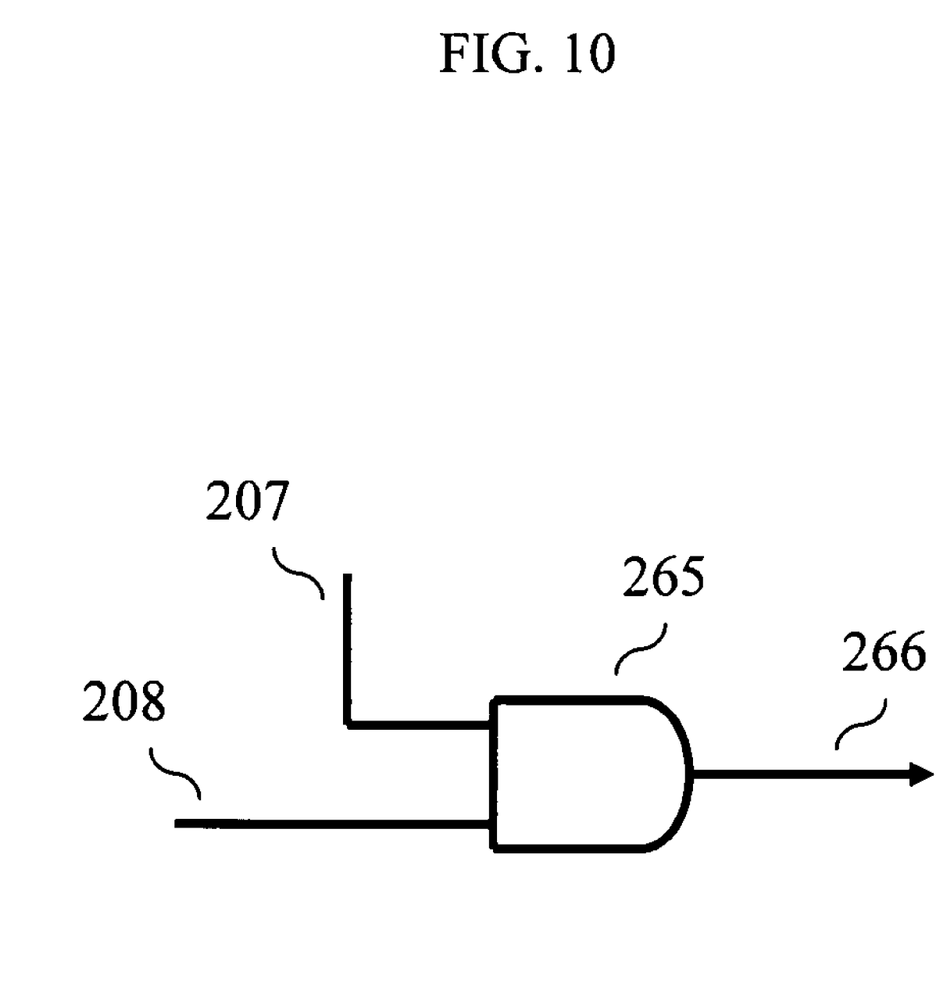
FIG. 10 illustrates control circuitry for use in adjusting taps to the left.
Figure 11:
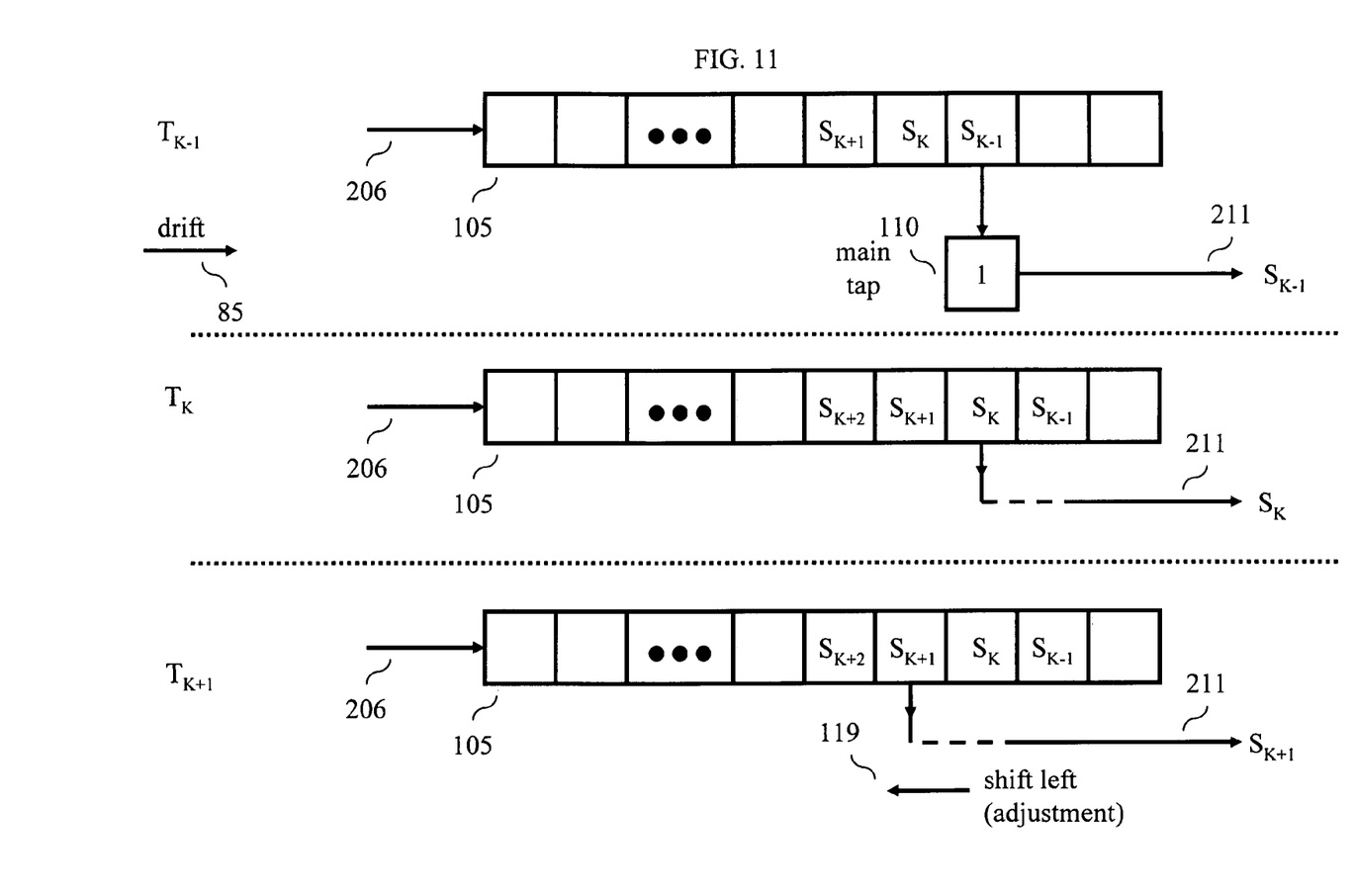
FIG. 11 further illustrates the effect of the control circuitry of FIG. 10.

Now, consider moving, or adjusting, the taps to the left. Again, without loss of generality, a flat channel is considered for simplicity (that has only a single main tap). This is illustrated in FIG. 9. FIG. 9 is similar to FIG. 7, the feed-forward filter 210 comprises a shift register 105 into which samples of the received signal (via signal 206) are clocked (signal 208 of FIG. 4, the clock is not shown in FIG. 9) and a single tap 110 (also referred to as the main tap) having an illustrative coefficient value of "1" for the purposes of explaining the inventive concept. The single tap 110 represents the equalizer response of feed-forward filter 210. At a sample time $T_{k-1}$ the corresponding sample value in shift register 105 has an illustrative value of $S_{K-1}$. This sample value of the shift register is applied to main tap 110 for providing an output signal 211 of the feed-forward filter, which in this example is simply the value of $S_{K-1}$ (since the tap coefficient value is "1"). At the next sample time, $T_k$ the values in shift register 105 are shifted to the right and the corresponding sample value in shift register 105 associated with main tap 110 has an illustrative value of $S_K$—with the result that the output signal 211 has a value of $S_K$. It should be noticed that for simplicity, main tap 110 is now shown in FIG. 9 at sample time $T_k$ in dashed line form as a part of the arrow associated with output signal 211. However, now assume that controller 220 determines that the main tap is getting too close to the right edge (the taps are drifting in the direction of arrow 85 of FIG. 9) and that controller 220 now shifts left (adjusts) the main tap location, via control signal 221. Then, at the next sample time $T_{k+1}$, and as can be observed from FIG. 9, this results in the value of $S_{K+2}$ being output by feed-forward filter 210. Unfortunately, this would result in sample value $S_{K+1}$ being skipped. Therefore, and in accordance with the principles of the invention, controller 220, via control signal 223 inhibits the skipping of sample "$S_{K-1}$". In particular, in order to prevent the sample at time index K+1 from being skipped, the response adjustment is timed to happen, via control signal 223, on such a sample at time index K that the incoming clock is disabled on the next clock period. Then, on the edge K, the response is moved to the left, and the next clock period for the downstream blocks is re-enabled via Enable 2 (note that the incoming upstream clock period remains disabled so that the FF filter shift register does not shift). This way, the sample $S_{K+1}$ is 're-inserted' into the downstream data. In particular, front-end processing element 205 provides an enable signal 207 (shown as Enable 1) in FIG. 4 to feed-forward filter 210. When this signal is low, controller 220, via control signal 223, adjusts the tap to the left. In particular, before the next clock edge after the movement of the main tap occurs, front-end processing element 205 pulls signal 207 "LOW" (e.g., a logic level of "0") from time-to-time for inhibiting the clocking of shift register 105 of feed-forward filter 210. In this regard, feed-forward filter 210 includes, e.g., logic such as the "AND" gate 265 shown in FIG. 10. When signal 207 (Enable 1) is "LOW", controller 220 adjusts the tap to the left such that, in effect, the sample "$S_{K-1}$" does not shift as illustrated in FIG. 11 at sampling time $T_{K+1}$. As a result, the sample "$S_{K-1}$" is not skipped and is re-inserted into the data stream provided to downstream processing element 215.

As described above, the inventive concept uses the equalizer to track the dynamic transmission channel changes as well as any residual sample timing offset. It should also be noted that groupings of components for particular elements described and shown herein are merely illustrative. For example, although FIG. 3 shows a display 20 internal to apparatus 10 (such as in a television (TV) set), this is not required and, e.g., display 20 could be external to apparatus 10 and, indeed, located further away. For example, apparatus 10 could be a set-top box or server which further distributes a signal for viewing on display 20.

In view of the above, the foregoing merely illustrates the principles of the invention and it will thus be appreciated that those skilled in the art will be able to devise numerous alternative arrangements which, although not explicitly described herein, embody the principles of the invention and are within its spirit and scope. For example, although illustrated in the context of separate functional elements, these functional elements may be embodied in one, or more, integrated circuits (ICs). Similarly, although shown as separate elements, any or all of the elements (e.g., of FIG. 4) may be implemented in a stored-program-controlled processor, e.g., a digital signal processor, which executes associated software, e.g., corresponding to one, or more, of the steps shown in, e.g., FIG. 6. Further, the principles of the invention are applicable to other types of communications systems, e.g., satellite, Wireless-Fidelity (Wi-Fi), cellular, etc. Indeed, the inventive concept is also applicable to stationary or mobile receivers. It is therefore to be understood that numerous modifications may be made to the illustrative embodiments and that other arrangements may be devised without departing from the spirit and scope of the present invention as defined by the appended claims.

The invention claimed is:

1. A method for use in a receiver, the method comprising:
   determining a location of at least one tap of an equalizer having a feed-forward filter; and
   adjusting a position of the at least one tap of the equalizer if the determined location is within a number of taps of an edge of the equalizer, wherein if the determined location is within the number of taps of a left edge of the equalizer, the adjusting step includes:
      shifting the at least one tap at least one sample position to the right, and
      inhibiting processing of an output sample from the feed-forward filter of the equalizer.

2. The method of claim 1, wherein the determining step comprises:
   determining representative energy levels in one, or more, taps of the equalizer as a function of associated tap coefficient values for determining the location of the at least one tap.

3. The method of claim 1, wherein if the determined location is within the number of taps of a right edge of the equalizer, the adjusting step includes:
   shifting the at least one tap at least one sample position to the left.

4. The method of claim 3, wherein the adjusting step includes:
   inhibiting a shifting of samples in a shift register of the feed-forward filter of the equalizer while at the same time enabling downstream processing such that an input sample is reinserted into an output signal of the feed-forward filter.

5. The method of claim 1, wherein inhibiting processing of an output sample from the feed-forward filter includes:
   inhibiting a clock for use by a feed-back filter of the equalizer such that the output sample from the feed-forward filter of the equalizer is not processed by the feed-back filter.

6. The method of claim 1, wherein the receiver is an ATSC (Advanced Television Systems Committee) receiver.

7. Apparatus for use in a receiver, the apparatus comprising:
   an equalizer including a feed-forward filter; and
   a controller for determining a location of at least one tap of the equalizer and adjusting a position of the at least one tap of the equalizer if the determined location is within a number of taps of an edge of the equalizer, wherein if the determined location is within the number of taps of a left edge of the equalizer:
      the controller shifts the at least one tap at least one position to the right, and
      processing of an output sample from the feed-forward filter of the equalizer is inhibited.

8. The apparatus of claim 7, wherein the controller determines representative energy levels in one, or more, taps of the equalizer as a function of associated tap coefficient values for determining the location of the at least one tap.

9. The apparatus of claim 7, wherein the controller shifts the at least one tap at least one position to the left if the determined location is within the number of taps of a right edge of the equalizer.

10. The apparatus of claim 9, wherein the equalizer is inhibited from shifting samples in a shift register of the feed-forward filter of the equalizer while at the same time enabling downstream processing such that an input sample is reinserted into an output signal of the feed-forward filter.

11. The apparatus of claim 7, wherein a clock for use by a feed-back filter of the equalizer is inhibited such that the output sample from the feed-forward filter of the equalizer is not processed by the feed-back filter.

12. The apparatus of claim 7, wherein the receiver is an ATSC (Advanced Television Systems Committee) receiver.

13. The method of claim 1, wherein the at least one tap of the equalizer includes a main tap.

14. The method of claim 1, wherein the number of taps is at least two.

15. The apparatus of claim 7, wherein the at least one tap of the equalizer includes a main tap.

16. The apparatus of claim 7, wherein the number of taps is at least two.

* * * * *